United States Patent
Faure et al.

(10) Patent No.: US 9,031,245 B2
(45) Date of Patent: May 12, 2015

(54) METHOD AND DEVICE FOR DETECTING ACOUSTIC SHOCKS

(75) Inventors: Julien Faure, Ploubezre (FR); Alexandre Guerin, Rennes (FR); Claude Marro, Plouguiel (FR)

(73) Assignee: France Telecom, Paris (FR)

( * ) Notice: Subject to any disclaimer, the term of this patent is extended or adjusted under 35 U.S.C. 154(b) by 318 days.

(21) Appl. No.: 13/807,384

(22) PCT Filed: Jun. 17, 2011

(86) PCT No.: PCT/FR2011/051395
§ 371 (c)(1), (2), (4) Date: Dec. 28, 2012

(87) PCT Pub. No.: WO2012/001261
PCT Pub. Date: Jan. 5, 2012

(65) Prior Publication Data
US 2013/0101124 A1    Apr. 25, 2013

(30) Foreign Application Priority Data

Jun. 29, 2010   (FR) ...................................... 10 55256

(51) Int. Cl.
| H04R 29/00 | (2006.01) |
| G10L 25/00 | (2013.01) |
| H03G 11/00 | (2006.01) |
| G10L 15/14 | (2006.01) |

(52) U.S. Cl.
CPC .............. *H04R 29/00* (2013.01); *G10L 15/142* (2013.01); *G10L 25/00* (2013.01)

(58) Field of Classification Search
USPC ..................................................... 381/55–58
See application file for complete search history.

(56) References Cited

U.S. PATENT DOCUMENTS

| 2005/0105717 A1 | 5/2005 | Lawrie |
| 2007/0286428 A1* | 12/2007 | Luo ................................. 381/58 |

(Continued)

FOREIGN PATENT DOCUMENTS

| EP | 1471767 A2 | 10/2004 |
| FR | 2974656 A1 | 11/2012 |

(Continued)

OTHER PUBLICATIONS

Markov, A., "Extension of the Limit Theorems of Probability Theory to a Sum of Variables Connected in a Chain", The Notes of the Imperial Academy of Sciences of St. Petersburg VIII Series, Physio-Mathematicl College, XXII, No. 9, pp. 552-576, Dec. 5, 1907 (26 pages).

International Search Report and Written Opinion of the International Searching Authority dated Aug. 12, 2011 for International Patent Application No. PCT/FR2011/051395 (9 pages).

*Primary Examiner* — Paul S Kim
*Assistant Examiner* — Norman Yu
(74) *Attorney, Agent, or Firm* — David D. Brush; Westman, Champlin & Koehler, P.A.

(57) ABSTRACT

A method and device are provided for detecting acoustic shocks in an audio stream. The method includes: breaking down the audio stream into audio frames; analyzing the audio frames in order to assign each audio frame a category value from among a plurality of predefined values; and determining the probability of an acoustic shock occurring in a current frame, based on a sequence of a given length of category values assigned to a set of frames, using a two-state Markov model, defined by a predetermined transition matrix and transmission matrix.

11 Claims, 3 Drawing Sheets

(56) References Cited

U.S. PATENT DOCUMENTS

2012/0275252 A1 11/2012 Ferrant et al.
2012/0275253 A1 11/2012 Ferrant et al.
2012/0275254 A1 11/2012 Ferrant et al.

FOREIGN PATENT DOCUMENTS

FR 2974666 A1 11/2012
FR 2974667 A1 11/2012

* cited by examiner

METHOD AND DEVICE FOR DETECTING ACOUSTIC SHOCKS

CROSS-REFERENCE TO RELATED APPLICATIONS

This Application is a Section 371 National Stage Application of International Application No. PCT/FR2011/051395, filed Jun. 17, 2011, which is incorporated by reference in its entirety and published as WO 2012/001261 on Jan. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a method and device for detecting acoustic shocks.

In general terms, the present disclosure concerns the fields of audio technologies and speech-related technologies.

BACKGROUND OF THE DISCLOSURE

Acoustic shocks are sounds of the hissing type composed of one or more frequency components that may appear during the reproduction of a multimedia audio stream (speech, music, sound) and the mean level of which may be lower than the mean level of the useful digital audio signal and may go as far as saturation of the digital audio signal. Even at very low levels, acoustic shocks have a not insignificant impact on health (psychophysiological effects) in particular when they occur on telephone services, and more particularly in a call centre.

It is easy to detect acoustic shocks during periods of silence but it becomes difficult when the shock is at a low level and is added to speech or music.

Known protection techniques are based either on temporal (envelope) approaches and on the detection of signals with an excessively high energy, or on a finer analysis of the time-frequency type. In the first case, it is impossible to discriminate a speech signal from a shock, and even to detect a low-energy shock, especially when it is mixed in another signal (speech for example). In the second case, the detection is based on a calculation of physical parameters and on threshold values associated with these physical parameters. The previous techniques are still not very robust, in particular to the problem of detecting a mixed shock. The result is either numerous false alarms (detection of shock where there is only speech), and strong degradation of said speech, or non-detections, which no longer provides protection for the user.

The prior art knows, through the American patent application no 2005/0105717, a telephone interface system. This American patent application of the prior art describes a system for protection against acoustic shocks. This system is composed of several stages. There are in particular limiters, compressors, noise reducers and a module that detects and suppresses shocks of the pure sound type. This system affords, by means of a time/frequency analysis, detection of acoustic shocks. Nevertheless, its action is limited to a single frequency per band between [0-2300] and [2300-4000] Hz. In addition, the peak-detection algorithm remains dependent on the volume. Finally, in order to be able to detect all the shocks, the detection criterion as proposed in this American patent application of the prior art gives rise to numerous false detections over periods of speech. These excessively numerous false detections give rise to filtering of certain useful components of the speech signal, which impacts on the voice quality.

SUMMARY

An exemplary embodiment of the present invention concerns a method of detecting acoustic shocks in an audio stream, characterised in that it comprises the following steps:
breaking down said audio stream into audio frames;
analysing said audio frames in order to assign each audio frame a category value from a plurality of predefined values;
determining the probability of having an acoustic shock in a current frame, based on a sequence of given length of category values assigned to a set of frames, using a two-state Markov model, defined by a predetermined transition matrix and transmission matrix.

Thus the method according to an embodiment of the invention enables an efficient acoustic shock detection, that is to say better separation between the periods of shocks and non-shocks, at an identical or even lower computing cost and reaction time.

The use of Markov models makes it possible to effect a discrimination via a statistical detection based on the elements of the previous frames.

An embodiment of the present invention makes it possible to couple the use of physical indicators for detecting the presence of a shock independently of the sound level, and a Markov model that makes the detection and characterisation of these shocks more robust.

The parameters of the Markov model are conventionally calculated by learning on a database of acoustic shocks. The advantage is that the application of the model for detection/characterisation is then inexpensive and can easily be achieved in real-time in telephony equipment (gateways, telephones, dedicated platforms) or audio equipment (DSP).

In terms of results, the method according to an embodiment of the present invention makes it possible to detect mixed shocks in a speech signal, to energies 10 dB less than those of speech (for example: techniques based on time approaches on the contrary require levels very much greater than around 10 dB above). In addition, the method according to an embodiment of the present invention makes it possible to monitor shocks that vary quickly in energy and/or frequency over time.

According to one embodiment, analysing an audio frame comprises determining at least one physical indicator of the frame and discretising at least one indicator into category values by comparison with at least one predetermined set of thresholds.

According to a particular embodiment, a physical indicator is a frequency parameter defining an energy criterion per frequency band.

This makes it possible to discriminate the frequencies of shocks compared with the rest of the spectrum.

According to one embodiment, the method also comprises a step of determining acoustic shock frequencies as a function of the energy criterion per frequency band.

This makes it possible to initiate the subsequent treatment of the acoustic shocks.

According to a particular embodiment, the energy criterion is a function of the difference between the standardised energy spectrum of the frame and a function of the percentile of the standardised energy spectrum.

This makes it possible to be free from the sound level of the audio stream.

According to one embodiment, a physical indicator is a temporal parameter representing the zero-crossing level of the frame.

This makes it possible to obtain a better discrimination of the periods of shocks and those of non-shock.

An embodiment of the present invention also relates to a method of filtering acoustic shocks in an audio stream, characterised in that it comprises the following steps:
- detecting acoustic shocks by implementing the method of detecting acoustic shocks in an audio stream;
- filtering by frequency band according to the frequencies determined during the detection step.

An embodiment of the present invention also relates to a device for detecting acoustic shocks in an audio stream, characterised in that it comprises:
- a module for breaking down said audio stream into audio frames;
- a module for analysing said audio frames in order to assign each audio frame a category value from a plurality of predefined values;
- a module for determining the probability of having an acoustic shock in a current frame, based on a sequence of given length of category values assigned to a set of frames, using a two-state Markov model, defined by a predetermined transition matrix and transmission matrix.

An embodiment of the present invention also relates to a gateway in a communication network comprising the device for detecting acoustic shocks in an audio stream.

An embodiment of the present invention also relates to a communication terminal comprising the device for detecting acoustic shocks in an audio stream.

Finally, an embodiment of the present invention relates to a computer program containing code instructions for implementing steps of the method for detecting acoustic shocks in an audio stream, when these instructions are executed by a processor.

The optional features presented above in the context of the method may optionally apply to the device, to the gateway, to the terminal and to the program that we have just mentioned.

BRIEF DESCRIPTION OF THE DRAWINGS

The present disclosure will be understood better by means of the description, given below purely for explanation, of an embodiment of the invention, with reference to the accompanying figures.

DETAILED DESCRIPTION OF ILLUSTRATIVE EMBODIMENTS

Figure 1:
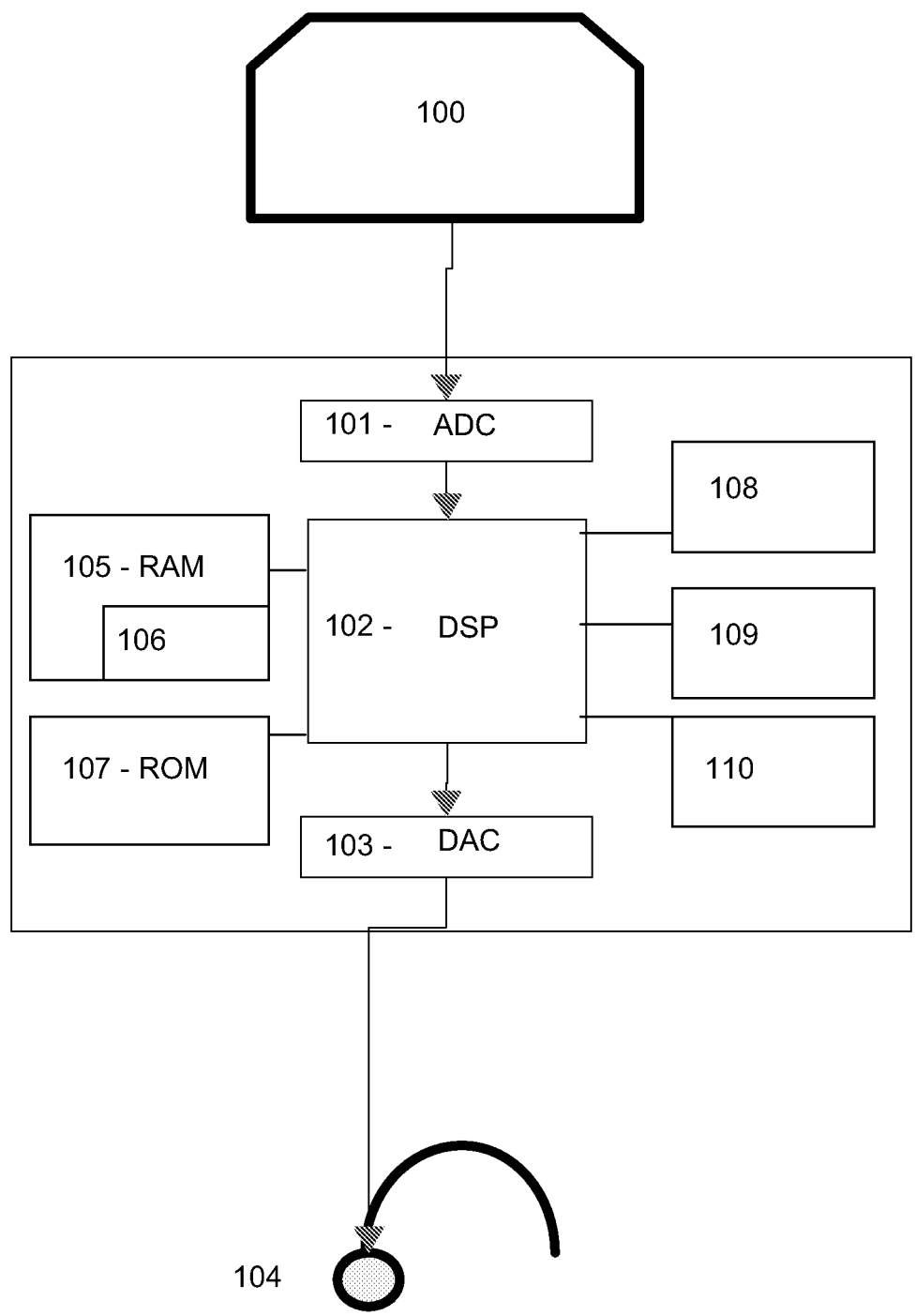
FIG. 1 illustrates the system according the present invention in one embodiment.

FIG. 1 shows the system with the detection device according to the present invention in one embodiment.

In this embodiment shown in FIG. 1, the method according to the present invention is implemented on a processor dedicated to signal processing (in this example of the DSP type, standing for "Digital Signal Processor").

In this embodiment, the processor is in an individual case. The system can be placed in chopping mode between the audio output (the headphone socket) of a telephone terminal (denoted 100 in FIG. 1) and the audio input of audio headphones (denoted 104 in FIG. 1).

A converter (denoted 101 in FIG. 1) converts the analogue audio signal into digital at a given sampling frequency (for example 8000 Hz). The algorithm implemented in the DSP (denoted 102 in FIG. 1) and using the information stored in the ROM memory (denoted 107 in FIG. 1) processes the data of the signal at the output of the ADC. The DSP (denoted 102 in FIG. 1) is also connected to a random access memory (denoted 105 in FIG. 1) in which a computer program (denoted 106 in FIG. 1) is executed. The method for detecting acoustic shocks according to an embodiment of the present invention is executed by the DSP connected to a frame chopping module (denoted 108 in FIG. 1), an analysis module (denoted 109 in FIG. 1) and a probability determination module (denoted 110 in FIG. 1).

A digital to analogue converter (denoted 103 in FIG. 1) reconverts the digital signal to analogue. The signal thus arriving at the headphones (denoted 104 in FIG. 1) is processed and no longer includes any acoustic shocks.

Figure 2:
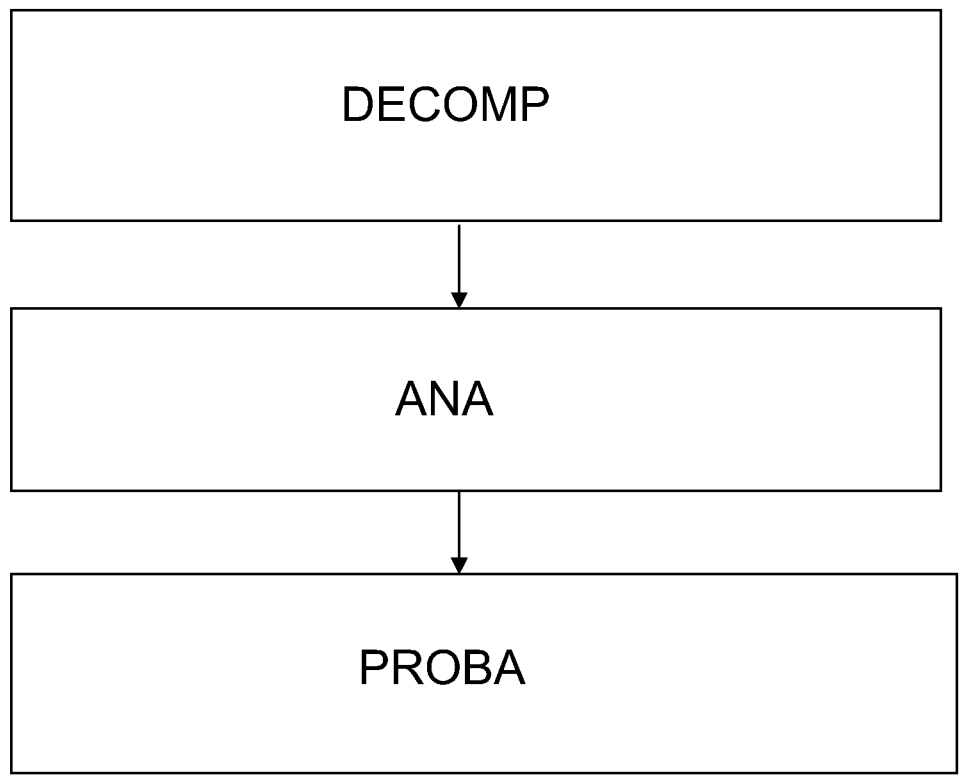
FIG. 2 shows the method according to an embodiment of the present invention.

FIG. 2 illustrates the method of detecting acoustic shocks according to an embodiment of the present invention. The method comprises the following steps:
- breaking down said audio stream FA into audio frames T1, T2, ... TP (the step denoted DECOMP in FIG. 2);
- analysing said audio frames T1, T2, ... TP in order to assign to each audio frame a category value from a plurality of predefined values (step denoted ANA in FIG. 2);
- determining the probability of having an acoustic shock in a current frame from a sequence of given length of category values assigned to a set of frames using a two-state Markov model, defined by a predetermined transition matrix MTR and a transmission matrix MRE (the step denoted PROBA in FIG. 2).

Figure 3:
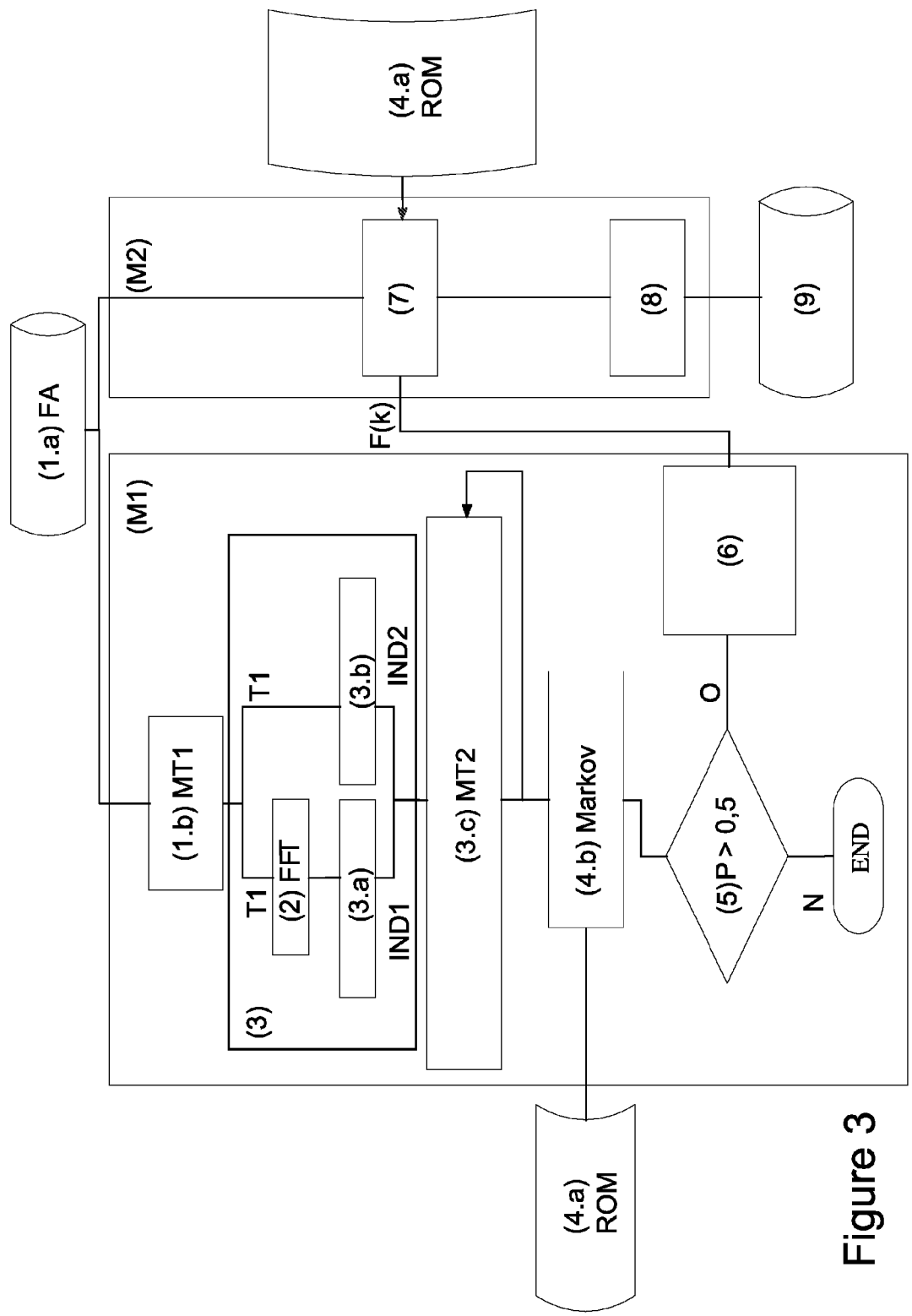
FIG. 3 illustrates an embodiment of the method according to the present invention.

FIG. 3 illustrates an embodiment of the method according to the present invention.

In this example, there is a detection module M1 and a processing module M2. In this example, the detection module M1 gives in real time the parameters F(N) used by the processing module M2 to filter the shocks (that is to say to suppress the parts of the signal identified as shocks). This operating mode reduces to the maximum possible extent the time taken for passing through the protector (that is to say the element formed by the assembly that protects the audio headphones) and avoids the problems of audio quality related to the introduction of a delay into the local effect (repetition of the stream captured by the local microphone in the headphones.

In the analysis M1 supplied as an example in FIG. 3:

The audio stream FA is put in a buffer MT1 (shown at 1.b in FIG. 3) in frames of Nech samples (for example 512) with an overlap of Rec samples (for example 128) using a suitable time window (for example of the Hanning type).

According to one embodiment, the analysis of an audio frame comprises the determination of at least one physical indication of the frame (Cf 3, FIG. 3) and the discretisation of at least one indicator into category values by comparison with at least one set of predetermined thresholds.

At least one physical indicator is used, which is for example a frequency parameter defining an energy criterion by frequency band or a time parameter that is the number of zero crossings.

The present invention is not limited to the exclusive use of these two indicators. For example, in an alternative embodiment, it is possible to use, alone or in combination:
- the linear prediction coefficients of the time frames
- the measurement of "spectral flatness", defined at the ratio between the geometric mean and the arithmetic mean of the power spectrum
- the energy by frequency band.

In a particular embodiment provision is made for calculating two physical indicators IND1 and IND2 (cf. 3.a and 3.b in FIG. 3).

For the indicator IND1, a discrete Fourier transformation of the signal (shown at 2 in FIG. 3) is carried out. This can be done by FFT ("Fast Fourier Transform").

Let S be the frame of N samples (N=512). Let $\tilde{S}$ be the Fourier transform of S. The standardised energy Snorm at the sample n is defined as:

$$Snorm(n) = \frac{|\tilde{S}(n)|^2}{\sum_{i=nmin}^{i=nmax} |\tilde{S}(i)|^2},$$

where nmin=57 and nmax=256 (for example)

Perc is defined as the $95^{th}$ centile of Snorm between the samples nmin and nmax. In this example, the indicator IND1 is defined as the maximum of the difference between Snorm and 3× Perc between the samples nmin and nmax.

$$\begin{cases} ind1 = \text{Max}(Snorm - 3 \times Perc) \\ n \in [nmin; nmax] \end{cases}$$

This indicator IND1 makes it possible to measure the frequency peaks of the spectrum, and in particular for the narrow frequency bands the energy of which is too great compared with the whole of the spectrum to be considered to be part of a speech spectrum.

The indicator IND2 is for example a time indicator that in this embodiment represents a number of zero crossings for the frame S compared with the number of samples of the frame.

Step 3.c discretises the indicator or indicators into categories by comparison with at least one set of thresholds.

In the case of a single indicator IND1, and a set of thresholds threshold1 of size n1, n1+1 category values are obtained.

In one example embodiment, for a set of thresholds: Seuil1={-0.0534 0.0003 0.0797 0.1282], the category of values cat 1 are obtained by:

$$\text{If} \begin{cases} ind1 \leq threshold1(1) \xrightarrow{then} cat1 = 1 \\ threshold(i) < ind1 \leq threshold1(i+1) \xrightarrow{then} ct1 = i+1 \\ ind1 > threshold(n1) \xrightarrow{then} cat1 = n1+1 \end{cases}$$

In the case of two indicators IND1 and IND2, two sets of thresholds threshold1 of size n1 and threshold2 of size n2 are used to categorise both the two indicators IND1 and IND2.

In this way n1+1×n2+1 category values are obtained.

To calculate a probability with a Markov chain, it is preferable to keep in memory a sequence of given length V of category values, for example 200.

In this particular embodiment, this sequence corresponds to the category value of the current frame and the 199 category values of the frames preceding the current frame.

The present invention is not limited to the exclusive use of a sequence composed of category values of the frames preceding the current frame. This is because it may also be composed of a subset of the category values of the previous frames and/or of the following frames.

The sequence of category values in this example is stored in a buffer MT2, which may for example be a circular buffer of 200 values. When the process is initialised, if the number of elapsed frames is less than 200, the buffer MT2 has a size equal to the number of frames elapsed.

From the sequence of V category values, it is thus possible to estimate the probability of being in a given state (shock or non-shock) for the current frame using a suitable two-state Markov chain, at step 4.b in FIG. 3.

The Markov chain is defined by a transition matrix that contains the probabilities p and q of transition between the shock and non-shock states as well as the probabilities of remaining in a given state. The probability values were calculated previously by learning on a base of audible samples for which the shock or non-shock states for each frame were known. These values were stored in the ROM (4.a in FIG. 3).

The theory of Markov chains is for example defined in the article by A A Markov "Extension of the limit theorems of probability theory to a sum of variables connected in a chain" (reprinted in Appendix B of: R Howard, Dynamic Probabilistic Systems, volume 1: Markov Chains. John Wiley and Sons, 1971).

For each of the two states, the learning phase also makes it possible to know the transmission probability, that is to say the probability that an audio frame analysed is classified in a category. These probabilities are grouped together in a transmission matrix with two columns, one per category and with n1+1×n2+1 rows. The values of the transmission matrix were stored in the ROM (4.a in FIG. 3).

The decision module implementing a decision step (denoted 5 in FIG. 3) is based on the probability issuing from the Markov chain that the current frame is a shock P. A frame is considered to be shock if the probability P is strictly greater than 0.5.

If the current frame is a shock, the K frequencies of the shocks, given by F(k) k=1 ... K, are all the values of frequency n for which Snorm(n)−3×Perc>0 where n ∈[nmin; nmax]. They are determined at the step denoted (6) in FIG. 3.

A step of filtering the acoustic shock is then implemented in the processing module.

The digital audio stream FA (shown at 1.a in FIG. 3) with a given sampling frequency (for example 8000 Hz) is subjected to a filtering module for attenuating or even suppressing the shocks at step 7. In a particular embodiment, this module is composed of K IIR ("Infinite Impulse Response") filters, where each filter is a band eliminator of the centre frequencies F(k) and bandwidth L(k). The values of the coefficients of the filters can be either predetermined (in this embodiment shown in FIG. 3, all the coefficients of all the filters corresponding to the frequencies to be filtered are stored in the ROM (4.a in FIG. 3)), or calculated on the fly (this makes it possible to reduce the size of the memory to the detriment of complexity).

Optionally, the filtered stream then arrives in a dynamic range compression module implementing a step 8 of suppressing the filtering modules and the wide-band high-energy shocks not detected by the module M1.

The audio stream output (9) is thus treated against acoustic shocks.

The use of Markov models makes it possible to effect a discrimination via a statistical detection based on the elements of the previous frames.

The Markov model proposed above was trained on physical indicators independent of the noise level. Thus the protection is effective whatever the input levels.

One of the other advantages of Markov models is that the latter are trained via predefined bases and criteria. It is thus possible to produce a detector adapted to a given requirement (for example: no false detection, 100% of shocks detected as from the second frame of shocks, etc.).

For example, if the Markov models are trained both for maximising the detection rate, minimising the false detection rate and having a reduced reactivity time, an embodiment of the present invention makes it possible to detect on average 98% of the shocks with only 3% of false detections. Among the 3% false detections, 90% have a duration of less than 100 ms and 100% have a duration of less than 200 ms. The reactivity time of the algorithm is also high since 95% of the shocks are detected in less than 24 ms.

One of the most direct applications of an embodiment of the present invention is the protection of users of telecommunication services. This is because t an embodiment of he present invention makes it possible to detect shocks and can be coupled to a processing module that will for example filter the shocks or cut the audio stream.

This processing can be implemented in an individual protective box that would be in chopping mode between the telephone of the user and the audio headphones (or the receiver). This type of equipment already exists, but the performance of existing equipment is open to improvement, either in terms of efficacy of detection and protection, or in terms of voice quality related to the presence of false alarms. The processing can also be implanted in telephones. Finally, this processing can also be employed in gateways, computers, digital television decoders or other terminals.

The invention is described above by way of example. It is understood that a person skilled in the art is in a position to produce different variants of the invention without for all that departing from the scope of the patent.

The invention claimed is:

1. A method of detecting acoustic shocks in an audio stream, wherein the method comprises the following steps:
   breaking down said audio stream into audio frames;
   analysing said audio frames by a detection device in order to assign each audio frame a category value from a plurality of predefined values; and
   determining a probability of having an acoustic shock in a current frame by the detection device, based on a sequence of given length of category values assigned to a set of frames, using a two-state Markov model, defined by a predetermined transition matrix and transmission matrix.

2. The method according to claim 1, wherein analysing an audio frame comprises determining at least one physical indicator of the frame and discretising the at least one indicator into category values by comparison with at least one predetermined set of thresholds.

3. The method according to claim 2, wherein the physical indicator is a frequency parameter defining an energy criterion by frequency band.

4. The method according to claim 3, wherein the method also comprises a step of determining the acoustic shock frequencies as a function of the energy criterion by frequency band.

5. The method according to claim 3, wherein the energy criterion is a function of the difference between a standardised energy spectrum of the frame and a percentile function of the standardised energy spectrum.

6. The method according to claim 2, wherein the physical indicator is a time parameter representing the amount zero crossing of the frame.

7. The method according to claim 4, wherein the method further comprises:
   filtering the acoustic shocks in the audio stream,
   which comprises filtering by frequency band according to the frequencies determined during the detection step.

8. A device for detecting acoustic shocks in an audio stream, wherein the method comprises:
   a module configured to break down said audio stream into audio frames;
   a module configured to analyse said audio frames in order to assign each audio frame a category value from a plurality of predefined values; and
   a module configured to determine a probability of having an acoustic shock based on a sequence of given length of assigned category values using a two-state Markov model, defined by a predetermined transition matrix and transmission matrix.

9. A communication Communication network gateway comprising the device according to claim 8.

10. A communication terminal, comprising the device according to claim 8.

11. A non-transitory computer-readable memory comprising a computer program containing code instructions for implementing steps of a method of detecting acoustic shocks in an audio stream, when these instructions are executed by a processor, wherein the code instructions comprise:
   instructions that configured the processor to break down said audio stream into audio frames:
   instructions that configured the processor to analyse said audio frames by a detection device in order to assign each audio frame a category value from a plurality of predefined values; and
   instructions that configured the processor to determine a probability of having an acoustic shock in a current frame by the detection device, based on a sequence of given length of category values assigned to a set of frames, using a two-state Markov model, defined by a predetermined transition matrix and transmission matrix.

* * * * *